United States Patent [19]
Kreye

[11] Patent Number: 5,752,342
[45] Date of Patent: May 19, 1998

[54] VENT WINDOW FOR MOTOR VEHICLES

[75] Inventor: Bernhard Kreye, Wunstorf, Germany

[73] Assignee: Henniges Elastomer- und Kunstsofftechnik GmbH & Co. KG, Rehburg-Loccum, Germany

[21] Appl. No.: 675,350

[22] Filed: Jul. 3, 1996

[30] Foreign Application Priority Data

Jul. 4, 1995 [DE] Germany ............ 195 24 243.2

[51] Int. Cl.$^6$ .................................... E06B 3/04
[52] U.S. Cl. .................................... 49/501; 49/381
[58] Field of Search ............ 49/501, 381, 397, 49/324; 16/225, 226

[56] References Cited

U.S. PATENT DOCUMENTS

| | | | |
|---|---|---|---|
| 3,232,333 | 2/1966 | Dixon | 16/225 |
| 3,562,955 | 2/1971 | Blomgren | 49/397 |
| 4,363,191 | 12/1982 | Morgan | 16/225 |
| 4,518,191 | 5/1985 | Williams et al. | 16/225 |
| 4,647,803 | 3/1987 | von der Heide et al. | 310/51 |
| 4,850,142 | 7/1989 | Sasamura et al. | 49/381 |
| 4,962,615 | 10/1990 | Birdling | 49/381 |
| 5,050,663 | 9/1991 | Rhoads et al. | 16/225 |
| 5,398,452 | 3/1995 | Schilde et al. | 49/501 |
| 5,457,913 | 10/1995 | Gold | 49/397 |
| 5,560,153 | 10/1996 | Gold | 49/397 |

FOREIGN PATENT DOCUMENTS 0 646 483   4/1995   European Pat. Off. .

Primary Examiner—Blair Johnson
Assistant Examiner—Curtis Cohen
Attorney, Agent, or Firm—Collard & Roe, P.C.

[57] ABSTRACT

An outwardly pivoting vent window for use with vehicles. The window has a front pivot around a substantially vertical axis in the direction of travel. The pivot connects with an upwardly-extending spar of the car body to form a hinge. The hinge between the car body and the windowpane has an adhesive layer disposed on a portion of the vent window adjacent the hinge area and an elastic casting compound secured to the vent window by the adhesive layer. A carrier bracket is partially embedded in the elastic casting and a mounting screw is seated in the casting compound and disposed through a hole in the carrier bracket for connection to the hinge of the car body. The carrier bracket can bend or flex under stress so that the mounting screw can be lifted off the surface of the casting compound.

4 Claims, 2 Drawing Sheets

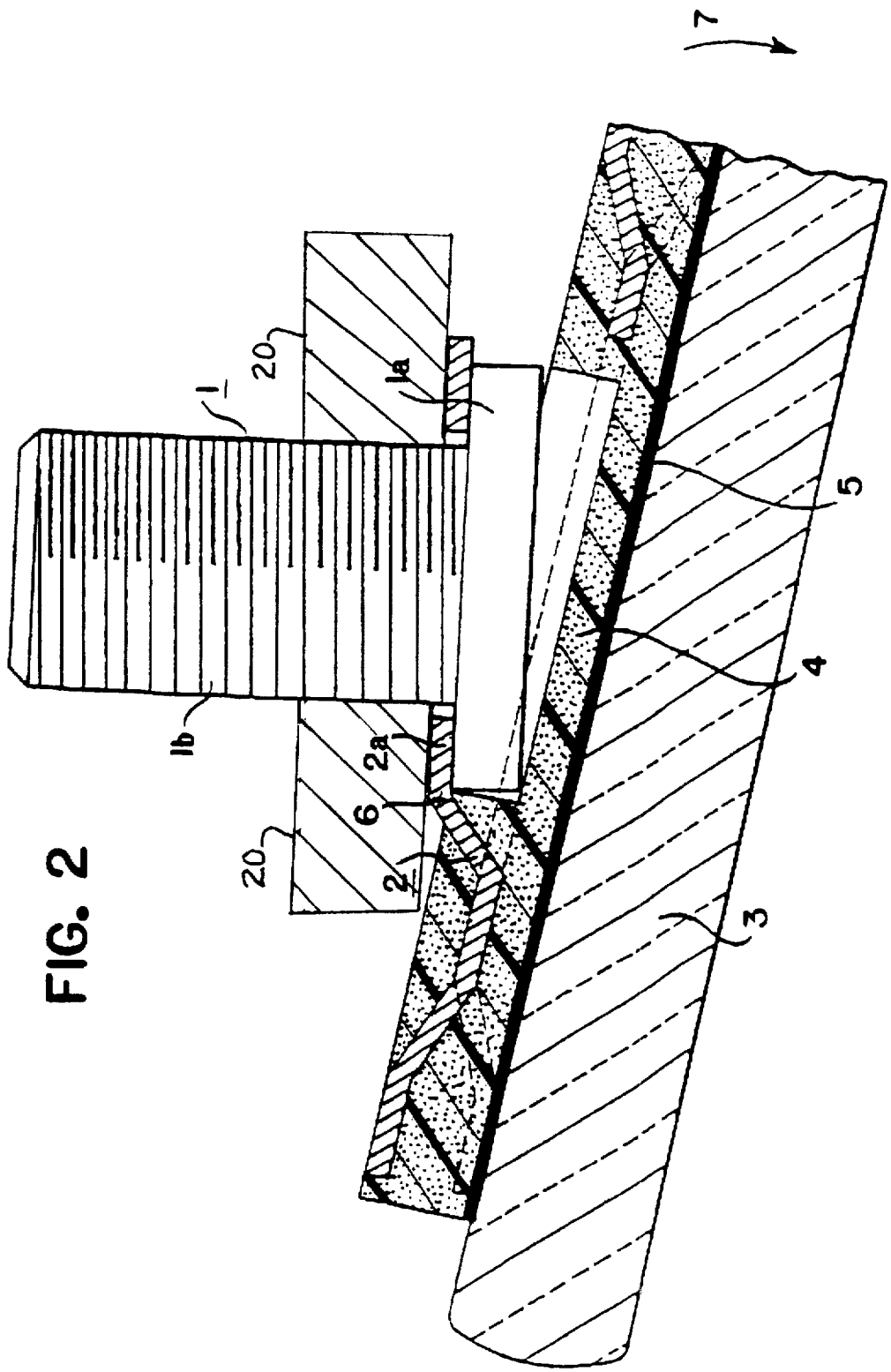

# 5,752,342

VENT WINDOW FOR MOTOR VEHICLES

BACKGROUND OF THE INVENTION

1. Field of the Invention

This invention relates to a vent window for motor vehicles, wherein the windowpane or window to be opened is pivotable around a substantially vertical pivot axis disposed in front of the car, in the direction of travel. The vent window has a pivot connection with the adjacent, upwardly-extending strut or spar of the car body. The hinge between the body and the windowpane consists of at least one metal carrier sheet or bracket that is connected to the spar of the car body by at least one mounting screw.

2. The Prior Art

In conventional vent windows for cars, the bracket or metal carrier sheet is bent a number of times and is directly fastened on the windowpane with an adhesive. Directly fastening the metal carrier sheet to the windowpane has the drawback of low elasticity. The metal carrier sheet or bracket is often pulled loose from the windowpane due pressure loads acting on the vent window. Since the metal carrier sheet can become stressed when the vent window is opened, the metal carrier sheet can deform in the area where it is adhesively joined to the windowpane.

SUMMARY OF THE INVENTION

It is therefore an object of the present invention to overcome the drawbacks of the prior art and to provide a stronger and more stress-resistant connection between the metal carrier sheet and the vent window.

Accordingly, the present invention provides a bracket for a vent window wherein the metal sheet section that passes through the mounting screw is embedded in an elastic casting compound, and the casting compound is fastened on the windowpane with a layer of adhesive.

In the invention, the metal carrier sheet is embedded in an elastic casting compound and thus secured to the windowpane over an enlarged area and thus within an elastic mounting. Therefore, the elastic connection of the metal carrier sheet to the windowpane is highly stable. Moreover, when the vent window is opened, any stresses that occur will extend into the part of the metal carrier sheet that is embedded in the casting compound without stressing the connection with the windowpane. It has been found that the inherently elastic casting compound has the further advantage that in the presence of tensile stress, a suction effect occurs transversely to the windowpane between the latter and the casting compound, which additionally stabilizes the connection.

In a further embodiment of the invention, the metal carrier sheet is disposed in the casting compound so that it extends substantially parallel to the windowpane. In this way, a relatively large area of the metal carrier sheet is advantageously embedded in the casting compound, and therefore, the overall structure requires only a small space on the windowpane.

In another embodiment, the mounting screw is disposed through the metal carrier sheet, near the one end thereof, through a bore and in this area, the metal carrier sheet projects with a metal sheet section from the casting compound on the side remote from the windowpane. This design saves space and is very simple.

In a preferred embodiment, polyurethane is preferably used as the casting compound.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 2 is a cross-sectional view of the design of FIG. 1, with the window pane pivoted outwardly.

DETAILED DESCRIPTION OF THE PREFERRED EMBODIMENT

Figure 1:
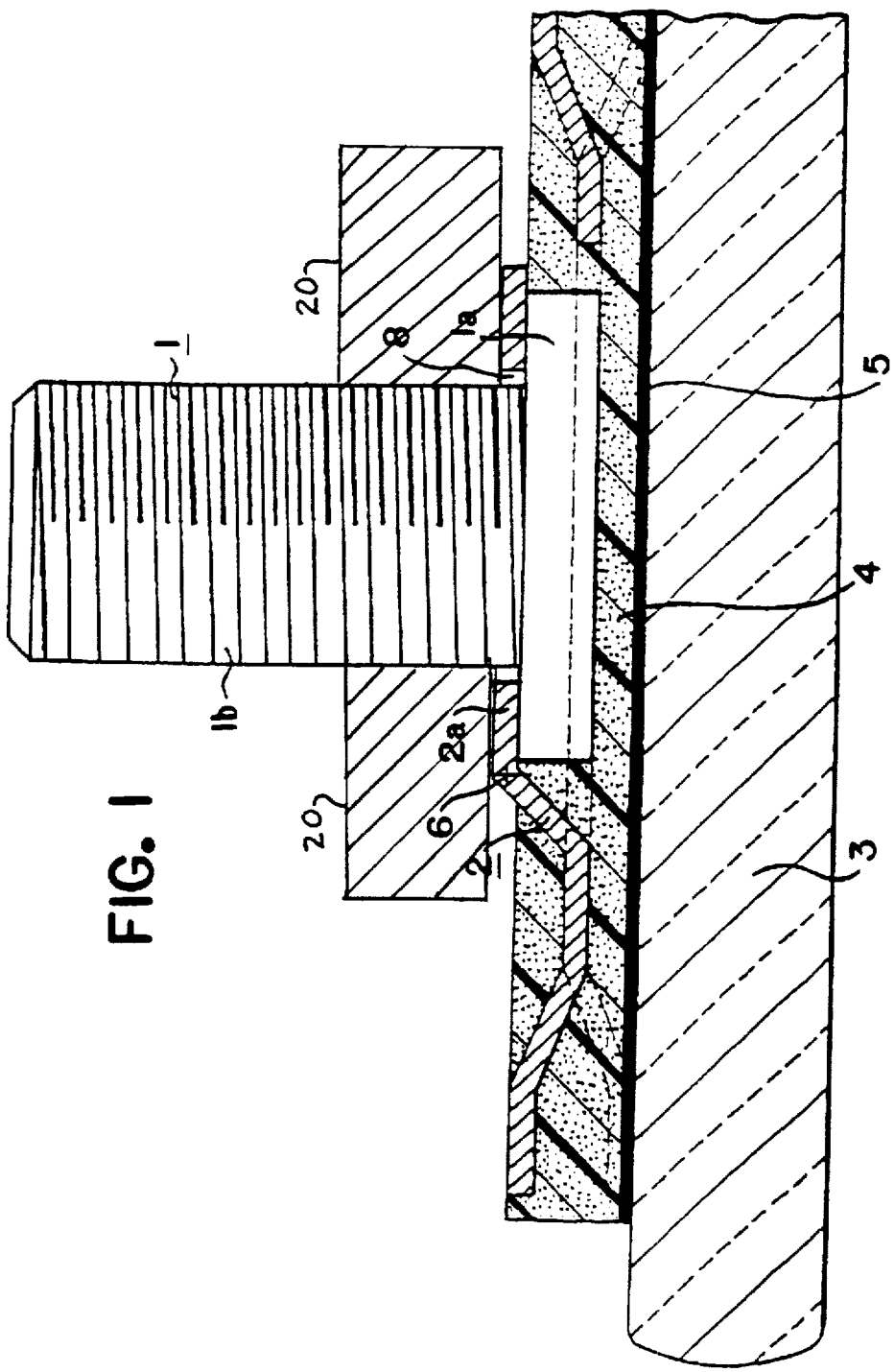
FIG. 1 is a cross-sectional view of a mounting of the pane of a vent window according to the invention.

Referring now in detail to the drawings and, in particular, FIG. 1, there is shown a casting compound 4 applied to a portion of a windowpane 3, the latter being disposed on the front surface in the direction of travel. A metal carrier sheet 2 is embedded in the casting compound, and at least one threaded mounting screw 1 is passed through and secured to the metal carrier sheet. Screw 1 is normally connected to an adjacent, upwardly-extending spar or strut (not shown) of the car body. Casting compound 4 is joined to windowpane 3 by an adhesive layer 5.

Metal carrier sheet 2, as a whole, extends approximately parallel with windowpane 3, and it is bent several times in different places, at acute angles. A sheet metal section 2a of the carrier sheet projects out from the surface of casting compound 4 on the side remote from windowpane 3, and extends approximately parallel with the windowpane. Sheet metal section 2a has a hole 8, so that shaft 1b of mounting screw 1 can be passed through hole 8. Screw head 1a is disposed on the side of the sheet metal, section 2a facing windowpane 3, and thus projects and seats into the casting compound without being bonded therein.

FIG. 2 shows the window as windowpane 3 in the outwardly pivoted position. The window has been pivoted and spaced in the direction of arrow 7. With this outward pivoting, section 6 of metal carrier sheet 2 is preferably bent or deformed slightly so that screw 1 with screw head 1a has partly lifted itself away from its seat on casting compound 4.

As can be seen in FIGS. 1 and 2, carrier sheet 2 has a central section 2a containing a bore 8 that is raised above its flat parallel portion (shown disposed in casting compound 4 in dotted lines). Raised central section 2a is connected at one end to metal carrier sheet 2 at section 6 so that it can flex or pivot, as shown in FIG. 2. The opposite ends of metal carrier sheet 2 can be forked so that a portion of each end is bend upward toward the top surface of casting compound 4 and a portion is bent downward toward adhesive layer 5 (shown in dotted lines). This increases the surface area in contact with compound 4 and thus adds to the strength and stability of sheet 2 within compound 4. The elastic casting compound is preferably polyurethane and the adhesive layer 5 can be any adhesive capable of bonding polyurethane to a glass surface. Carrier sheet 2 is preferably chosen from a sheet metal like steel that is not brittle, but can be stamped, die cut and bent into shape, and can flex, as in FIG. 2, without permanently becoming deformed.

Accordingly, while only a single embodiment of the present invention has been shown and described, it is obvious that many changes and modifications may be made thereunto without departing from the spirit and scope of the invention.

What is claimed is:

1. An outwardly pivoting vent window for use on the body of a car, wherein a front section of the window is adapted for pivotal connection around a substantially vertical axis to an upwardly-extending spar of the car body, comprising:

an adhesive layer disposed on a portion of the vent window;

an elastic casting compound secured to the vent window by said adhesive layer, said casting compound having a top surface;

a hinge comprising a flexible carrier bracket having a fixed portion embedded in said elastic casting compound, wherein a hinged portion of said carrier bracket is not embedded in said elastic casting compound; and a mounting screw seated in said casting compound and disposed through a hole in the hinged portion of said carrier bracket not embedded in said casting compound, said screw adapted for connecting the hinge to the upwardly extending spar of the car body.

2. The vent window according to claim 1, wherein said carrier bracket, disposed in said casting compound, extends substantially parallel to the surface of the vent window.

3. The vent window according to claim 2, wherein said carrier bracket includes a hinged portion is disposed on the top surface of said casting compound containing said mounting screw to permit the mounting screw and said hinged portion to bend away from the surface of said casting compound on a side remote from said window surface.

4. The vent window according to claim 3, wherein said casting compound comprises polyurethane.

\* \* \* \* \*